United States Patent [19]

Paules

[11] Patent Number: 5,061,334

[45] Date of Patent: Oct. 29, 1991

[54] MACHINE AND METHOD FOR HIGH SPEED, PRECISELY REGISTERED LABEL APPLICATION WITH SPROCKETS FOR POSITIONING THE LABEL ON A TRANSFER WHEEL

[75] Inventor: Eugene H. Paules, Huntington, Conn.

[73] Assignee: United States Tobacco Company, Greenwich, Conn.

[21] Appl. No.: 671,169

[22] Filed: Mar. 15, 1991

Related U.S. Application Data

[63] Continuation of Ser. No. 293,304, Jan. 4, 1989, abandoned.

[51] Int. Cl.⁵ ................................................ B44C 1/00
[52] U.S. Cl. .................................... 156/235; 156/521; 156/542; 156/568; 156/DIG. 35; 156/250; 156/510; 156/DIG. 33
[58] Field of Search ............... 156/235, 361, 541, 542, 156/567, 568, 569, 578, DIG. 34, DIG. 35, 521, DIG. 33, 543, 253, 513, 510, 250

[56] References Cited

U.S. PATENT DOCUMENTS

| | | | |
|---|---|---|---|
| 2,214,096 | 9/1940 | Weiss | 156/DIG. 35 |
| 2,788,150 | 4/1957 | Rose | 156/568 |
| 2,981,432 | 4/1961 | Flood | 156/DIG. 33 |
| 3,159,521 | 12/1964 | Pechmann | 156/DIG. 33 |
| 3,450,590 | 6/1969 | La Mers | 156/361 |
| 3,891,492 | 6/1975 | Watson | 156/361 |
| 4,192,703 | 3/1980 | Brown | 156/542 |
| 4,336,095 | 6/1982 | Hoffmann | 156/235 |
| 4,454,180 | 6/1984 | La Mers | 156/DIG. 33 |
| 4,687,535 | 8/1987 | Voltmer | 156/568 |
| 4,762,587 | 8/1988 | Deal | 156/567 |
| 4,874,456 | 10/1989 | Takagi | 156/471 |

Primary Examiner—Michael W. Ball
Assistant Examiner—Gregory J. Wilber
Attorney, Agent, or Firm—Fred A. Keire

[57] ABSTRACT

A high speed labeling machine and method is provided for transferring labels to articles such as cans; the labeling machine includes a device for supplying articles to be labeled, a label transfer wheel provided with individual groups of closely spaced vacuum holddown ports to enable a succession of closely spaced labels to be supported by the transfer wheel and carried by the transfer wheel to the articles, and a pressure severing device for releasing the label from a carrier stock for subsequent transfer from a transfer wheel to the article to be labeled; sprocket holes are utilized to align very precisely a label; such labels may be die cut on the printing press and retained on the carrier by pinpoint attachments or they may be die cut as the label is advanced; in a preferred embodiment, single layer label tapes with release agent on one surface and a pressure sensitive adhesive on the other surface provide added advantages of smaller spool sizes and faster speeds; single layer label tapes also make tamper-evident packaging very versatile and advantageous; another aspect is the significantly improved economics by reducing the number of layers to one instead of two for normal pressure sensitive labels as well as by eliminating the cost and problems associated with using glue applicators with many types of labeling products.

29 Claims, 12 Drawing Sheets

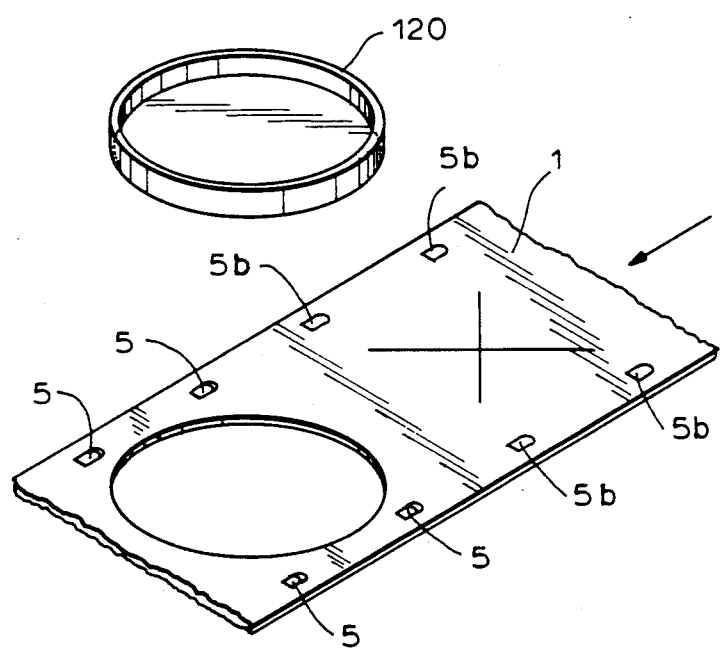
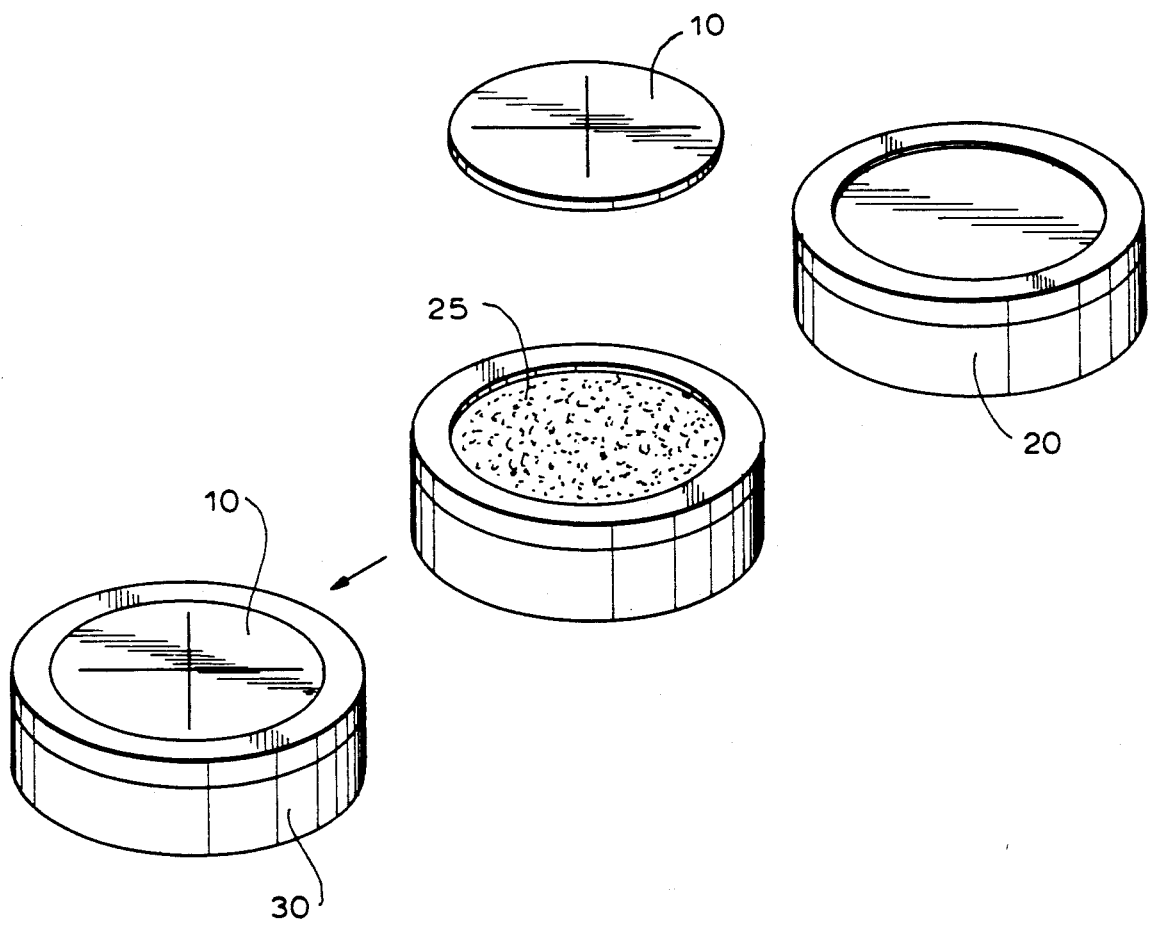
FIG. 9

MACHINE AND METHOD FOR HIGH SPEED, PRECISELY REGISTERED LABEL APPLICATION WITH SPROCKETS FOR POSITIONING THE LABEL ON A TRANSFER WHEEL

This application is a continuation of application Ser. No. 07/293,304, filed Jan. 4, 1989, now abandoned.

This invention relates to a machine and a method for applying labels to articles at high speeds; more particularly, the invention relates to a machine which transfers labels from a single web or from a single layer in combination with a glue application.

BACKGROUND FOR THE INVENTION

Present day article labeling machines comprise fairly complex mechanisms, the several operating components of which serve to transfer labels to various articles such as cans, bottles and like containers and packages. Due to the complexity, the interdependence and the several operating components of labeling machines, the maximum operating speed of these machines is normally limited to the slowest step in the process or to a rate limiting component in the machine. In many instances, the slowest steps and components comprise the label transfer and application means.

BRIEF DESCRIPTION OF THE INVENTION

The present invention provides a new and improved high speed labeling machine which combines rotational movement for transfer of a label to a container with uninterrupted linear motion for the container. This combination provides for a single layer web or for a glue application to a label carrying surface and deposition thereon of a label from a web.

The present invention also provides a labeling machine which may use simultaneously die cut labels which are driven in a "tractor feed" manner and applied on a glued surface of a container which may be fed in the same manner. This embodiment of the present invention may also use a monolayer, carrier free, pressure sensitive label wherein no glue is required on the container. Still further, a label cutting die may be used in combination with the "tractor feed" precisely registered label strips or tape. This combination ensures outstanding precision either individually or in combination in the cutting, transfer and placement steps when labels are used on containers. In addition, this invention is especially suitable in the use of tamper evident sealing of packages when used e.g. with the monolayer webs, i.e. labels.

PRIOR ART

There is a substantial amount of prior art relating to label application equipment, however none of it discloses the present invention or its advantages.

For example, U.S. Pat. No. 4,549,454 relates to a method whereby a strip of tape is cut at intervals, positioned and punched. The cut strips are held in place under vacuum.

U.S. Pat. No. 4,323,416 relates to labeling equipment for applying wrap around labels to cylindrical containers.

U.S. Pat. No. 4,283,245 relates to a bottle labeling apparatus comprising a conveyor for conveying evenly spaced-apart containers, and means for individually engaging containers and shifting containers laterally on the conveyor.

U.S Pat. No. 4,181,555 discloses a labeling apparatus and method for continuously severing labels from continuous label stock and applying the severed labels to containers.

U.S. Pat. No. 3,883,388 discloses a machine for making a plastic covering on a rigid base article which comprises a glass bottle and a conforming shrunken plastic covering thereon.

U.S Pat. No. 3,751,324 relates to a high speed addressing machine for transferring labels to envelopes.

U.S Pat. No. 3,749,626 discloses a rotary die apparatus and a process for manufacturing labels.

U.S. Pat. No. 3,348,525 relates to an apparatus for applying glue to bottles and other cylindrical articles.

U.S. Pat. No. 3,142,374 relates to a hold-down device or head grip of the endless belt type for use in labeling machines.

U.S Pat. No. 2,342,504 relates to a process of applying protective spot material to the inner surfaces of caps, particularly crown caps commonly used on bottles.

British Patent No. 978,914 relates to a feed mechanism of the worm type used for releasing bottles or like articles in spaced sequence into labeling machines.

BRIEF DESCRIPTION OF THE DRAWINGS

FIG. 9 is the same as FIG. 2 except that it additionally shows a die for cutting the labels;

DETAILED DESCRIPTION OF THE DRAWINGS AND DESCRIPTION OF EMBODIMENTS OF THE PRESENT INVENTION

Figure 1:
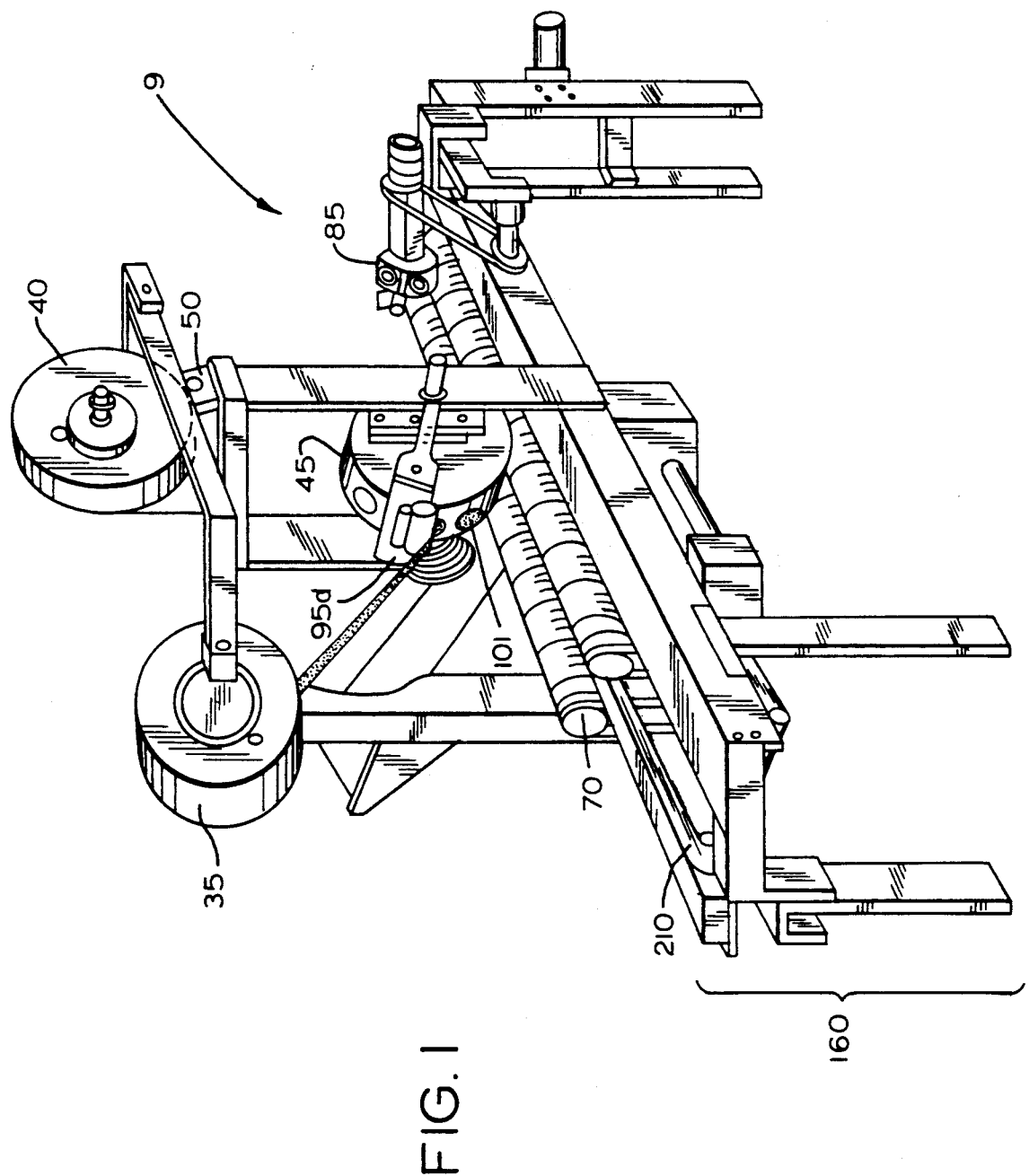
FIG. 1, is a perspective view of a machine embodiment of this invention.

A perspective view of a machine embodiment of the invention is shown in FIG. 1. Depicted is machine 9, having stand 160, supporting label reel 35, label transfer wheel 45, uptake reel 40, spent carrier tape 50, label pads 101 on label transfer wheel 45, conveyor chain 210, glue applicator wheel 85, screw helices 70 and tension control arm 95d. Details of the various components of the machine 9 will be described further herein.

The present invention as described herein uses a tractor feed styled label strip or tape to assure extremely close registry and precise positioning of labels on articles at very high rates, e.g., 400 article per minute and more.

Figure 2:
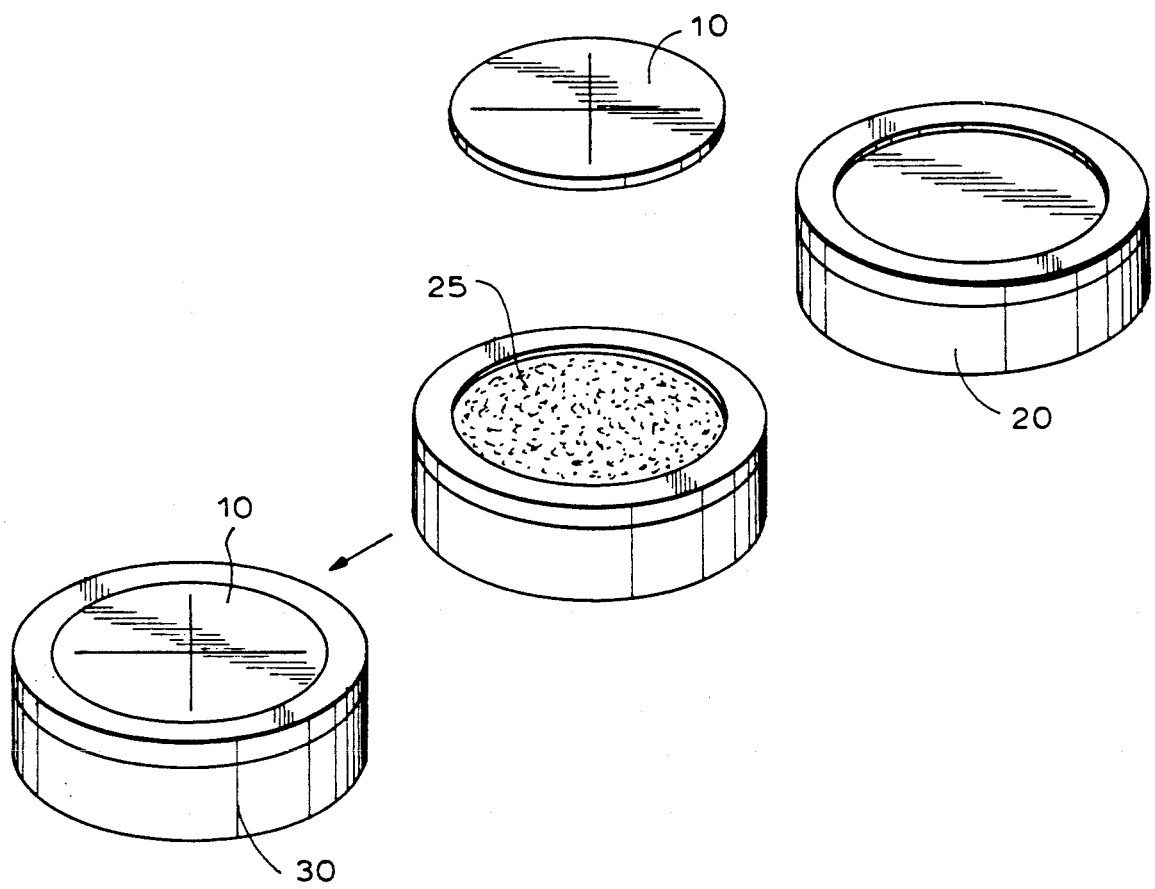
FIG. 2 is a schematic view of a label being transferred from the carrier tape to the article.

A schematic view of the tractor feed embodiment is shown in FIG. 2. A monoweb carrier tape 1 is provided utilizing sprocket holes 5 for properly and accurately aligning a label 10 that is die cut. In a departure from conventional sprocket holes cut for a tractor feed, in order to provide better registry and avoid problems from expansion or contraction caused by humidity, the sprocket holes are cut in the form of a tongue, but these are not severed from the web. A number of advantages reside in such an arrangement, e.g., rotational die cutting may be used. As mentioned before, sufficient tolerance for the expansion or contraction of a web due to humidity changes is provided by means of such sprocket hole 5 configuration. Consequently, sprocket holes 5 need not be cut oversize. A retained hole tab 5b also has an advantage in die cutting. Cut hole material interferes with the spooling of a web, while a retained hole tab 5b does not. Sprocket 5a (not shown here) may thus engage sprocket hole 5 with a great assurance of precision for positioning a label. Because of this precisely pre-cut sprocket hole 5 feature, the labels 10 may be preprinted before these are die cut. Likewise, the labels 10 may be die cut on the printing press. If the labels 10 are die cut on the printing press, these may be retained on a carrier by approximately four pin point-like, or tab-like attachments, 15. These pinpoint attachment tabs 15 may be greater or fewer in number and may be oriented around the periphery of the label as required for support and ease of severance. A label 10 is released and applied to an article such as a can 20. If a glue is used, the article 20 carries a deposited glue 25 and the label 10 is applied resulting in a labeled article 30.

Figure 3:
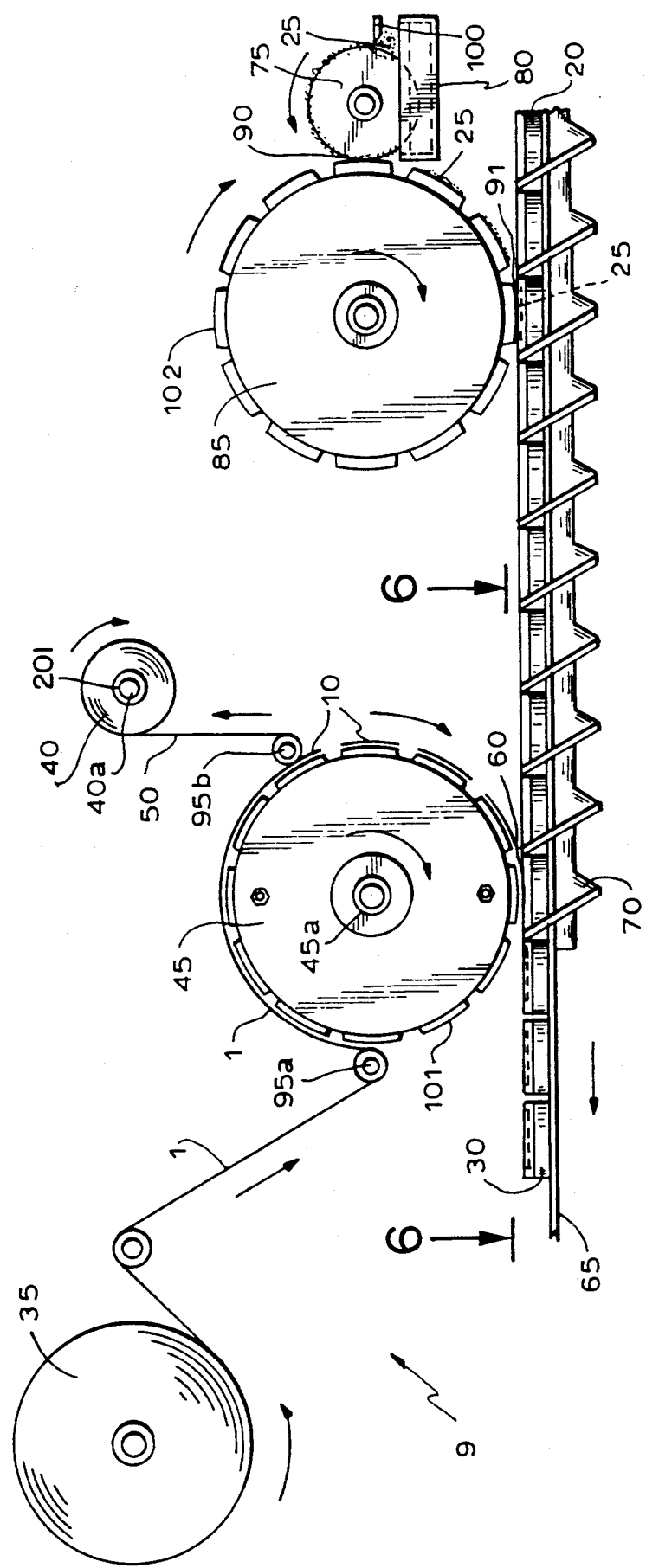
FIG. 3 is a schematic side view of the high speed labeling machine of the present invention.

Referring now to FIG. 3, there is shown a side view of the high speed labeling machine 9 of the present invention. A label reel 35 supplies the pressure sensitive labels 10 of the carrier tape 1. However, the labels 10 are either precut or die cut on the machine herein and remain attached to the tape 1 by pinpoint attachment tabs 15 shown on FIG. 2. The carrier tape 1 is aligned by way of sprocket holes 5 (not shown on FIG. 3, but shown in FIG. 2) on either side of said tape. The expression "Carrier tape 1" is used to define a tape to which labels are attached by pinpoint attachment tabs 15. The left over stock tape after labels are excised is designated as spent carrier tape 50.

The carrier tape 1 is fed in the direction of the arrows as shown in FIG. 3 and held under constant tension by the roller 95. A free wheeling roller 95a is a feed-on roller for the carrier tape 1, and feeds the carrier tape 1 onto the label transfer wheel 45. Instead of being a freewheeling roller, roller 95a may also function as a constant tension roller, in which case roller 95 is eliminated. When thus functioning as constant tension roller, an eddy current driven clutch mechanism (not shown but readily available in the art) adjusts a braking force exerted on the carrier tape 1. Hence an appropriate tension control arm 95d, shown in FIG. 1, is used to weigh down roller 95a to compensate for the changing moment arm between the maximum and minimum radius of the carrier tape 1 when the carrier tape 1 is removed from label reel 35.

The label transfer wheel 45 has a drive shaft 45a. The label transfer wheel 45 carries on its outer periphery on each peripheral edge thereof sprockets 5a (shown in FIG. 5) which engage the sprocket holes 5. As each sprocket 5a engages sprocket hole 5, free wheeling roller 95a assures the subsequent positive engagement of the sprockets 5a in sprocket hole 5. As the drive shaft 45a turns all driving pulleys on the shaft 45a by a single motor 105 (shown in FIG. 5), positive, synchronous drive is assured for all driven pulleys. The use of sprocket holes 5 interacting with sprockets 5a, and the use of constant tape tension by roller 95a, provide precise alignment.

The label transfer wheel 45 holds the labels 10 by vacuum suction on label pads 101 while the spent carrier tape 50 is removed by uptake reel 40. As the label 10 needs to be positively removed from a carrier tape 1, roller 95b may carry on it a cam surface 95c (shown in FIG. 7) replicating in its form the label 10; i.e. round, square, oblong, etc. Uptake reel 40 is positively driven by motor 105 (shown in FIG. 5) via shaft 40a, pulleys 40b and 40c (shown in FIG. 5) and a toothed belt 40d (shown in FIG. 5) so that it rotates not synchronously with label transfer wheel 45 but via slip clutch 201 (shown in FIG. 3) to compensate for continuously variable core diameter. As spent carrier tape 50 is wound onto uptake reel 40, the diameter of uptake reel 40 increases. The slip clutch 201 compensates for this change in diameter so that uptake reel 40 rotates at a proper speed to ensure outstanding precision. As further shown in FIG. 7, the label 10 is released by a pressure means 115 and thereby applied to an article at point 60 as will be further explained herein. Further, refinements in the vacuum suction step and pressure release step will also be discussed herein below.

When applying non-pressure sensitive labels, depicted in FIG. 3 are means for applying glue 25 to the can 20. Glue supply wheel 75 picks up glue 25 from a glue supply source 80. A doctor blade 100 trims excess glue off the glue supply wheel 75. Glue 25 is applied to the glue pads 102 on glue applicator wheel 85 at point 90. The glue applicator wheel 85 turns in the direction of the arrow and deposits glue 25 at deposit point 91 on the articles, e.g., a can 20, which is to be labeled. The articles to be labeled, such as cans 20, are advanced by a conveyor means 65 and in a positive manner, between oppositely rotating screw helices 70 further shown in FIG. 6. An article 20 with glue 25 on its top surface continues along the conveyor means to point 60 where the label 10 is applied resulting in labeled article 30.

Elaborating in greater detail on another embodiment of the invention previously mentioned above, the glue supply wheel 75 and glue applicator wheel 85 may be inactivated or eliminated. In FIG. 3, a monolayer pressure sensitive label 10 as part of a unitary carrier tape 1, may be used which eliminates the need for applying glue 25 to the article 20. The label 10 still would be die cut on a printing press and retained on the carrier by three, four or more pinpoint attachment tabs 15 (shown in FIG. 2). There may be one or more pinpoint attachment tabs 15 at the leading edge of the label 10. The spent carrier tape 50 is peeled away from the label 10 by roller 95b with its label replicating cam surface 95c and the spent carrier tape 50 is removed by the uptake reel 40. In order to assure an even more positive removal of the monolayer, pressure sensitive label 10, a device may be used which may function to remove positively the labels 10 from carrier tape 1. This is accomplished by the device shown in FIG. 12 herein. This device will be further explained. The label 10 is held in place by vacuum suction on the label transfer wheel 45 with the pressure sensitive gummed side exposed. The label 10 is released by a pressure means 115 (shown in FIG. 7) and thereby applied to an article at point 60 (FIG. 3) so that the gummed side adheres the label 10 to the article.

When a monolayer pressure sensitive label or tape is used, Teflon coated rollers, e.g., 95a and 95b are employed wherever the pressure sensitive adhesive contacts the machine 9. This prevents the label or tape from sticking to the rollers 95a and 95b, etc.

As mentioned before, the last roller 95b is positioned so that it assists the vacuum suction when the carrier tape 1 is removed from the label 10. An idle arm 2 (not shown), eddy current and magnetic brake are also employed to properly increase or decrease the tension as the carrier tape 1 is removed from the supply wheel and wound on the uptake reel 40. When either a glued-on label or a monolayer pressure sensitive label is used, precision is extremely important since the labels must be in proper registry with the can or container. Still, using a monolayer pressure sensitive label 10 may be preferable to using glue because there is a possibility of cans coming through without lids and the glue wheel may pick up particulates on its surface. Consequently, the glue wheel may then require down time for clean up and other like problems.

Figure 12:
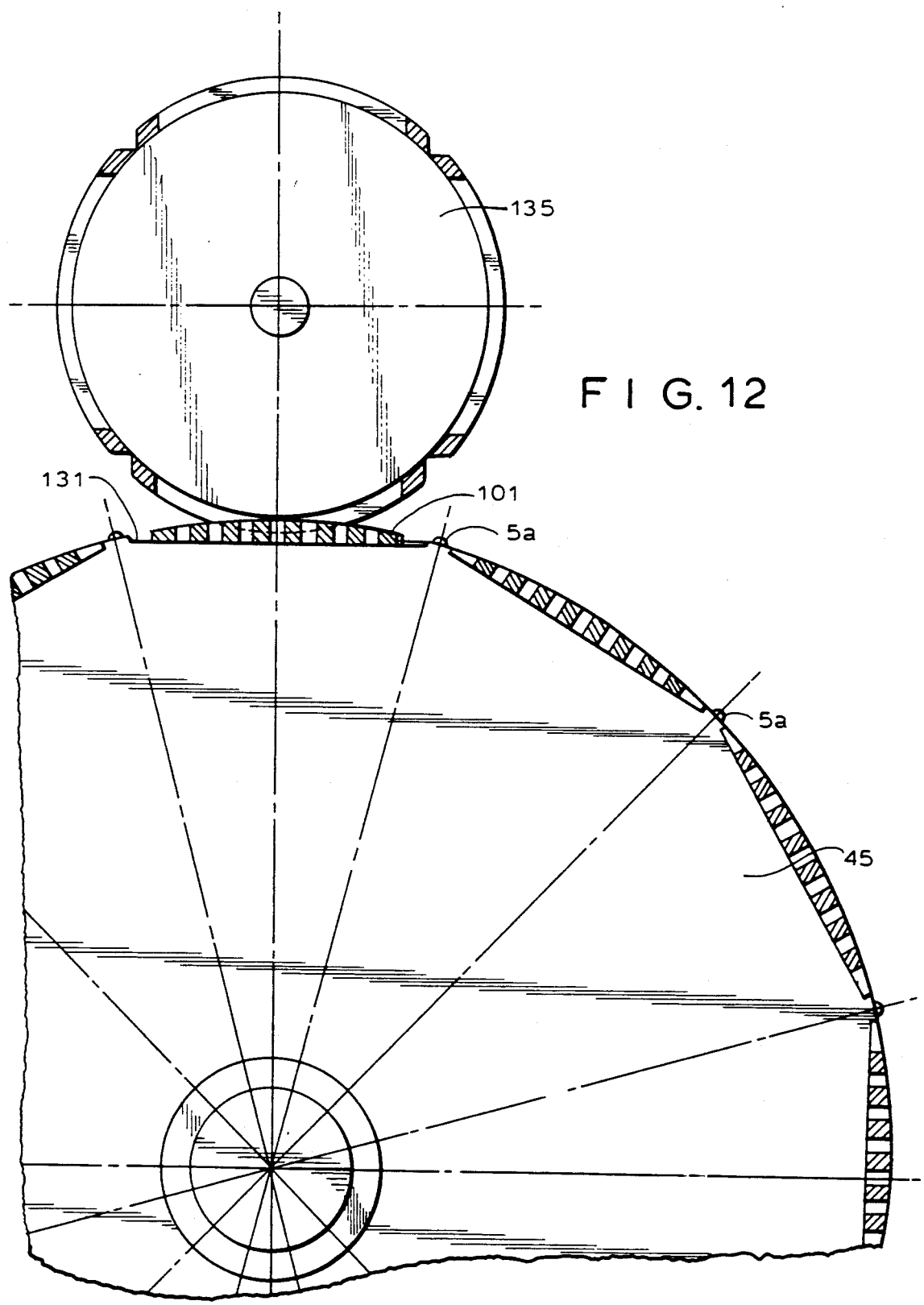
FIG. 12 is a cross-sectional, enlarged view of a label release wheel in position.

In place of roller 95b with a label replicating cam surface, label release wheel 135 as shown in FIG. 12 may be positioned above the transfer wheel 45 and synchronously driven to sever the pinpoint attachment tabs 15 holding the label 10 to the carrier tape 1. The label release wheel 135 is positioned so that it pushes the carrier web around the label perimeter and down approximately ⅛ inch thereby severing the pinpoint attachment tabs 15 (not shown here). The pad 101 on the label transfer wheel 45 is raised ⅛ inch so that there is a recessed area 131 around each pad 101. The revolutions per minute (RPM) or peripheral of the label release wheel 135 is three times the speed of the label transfer wheel 45. As both wheels spin, the periphery of the label release wheel 135 fits into the recessed area 131 around pad 101 and therefore severs the label 10. As described before, the label 10 has previously been positioned by the sprockets 5a and held by vacuum onto pad 101. This feature is particularly important for irregularly shaped labels and for monolayer pressure sensitive labels. For monolayer pressure sensitive labels, it is also important that surfaces be made of Teflon which contact the adhesive surface of the monolayer web. In any event, each component of the machine is appropriately sized and synchronized for outstanding efficiency.

Figure 4:
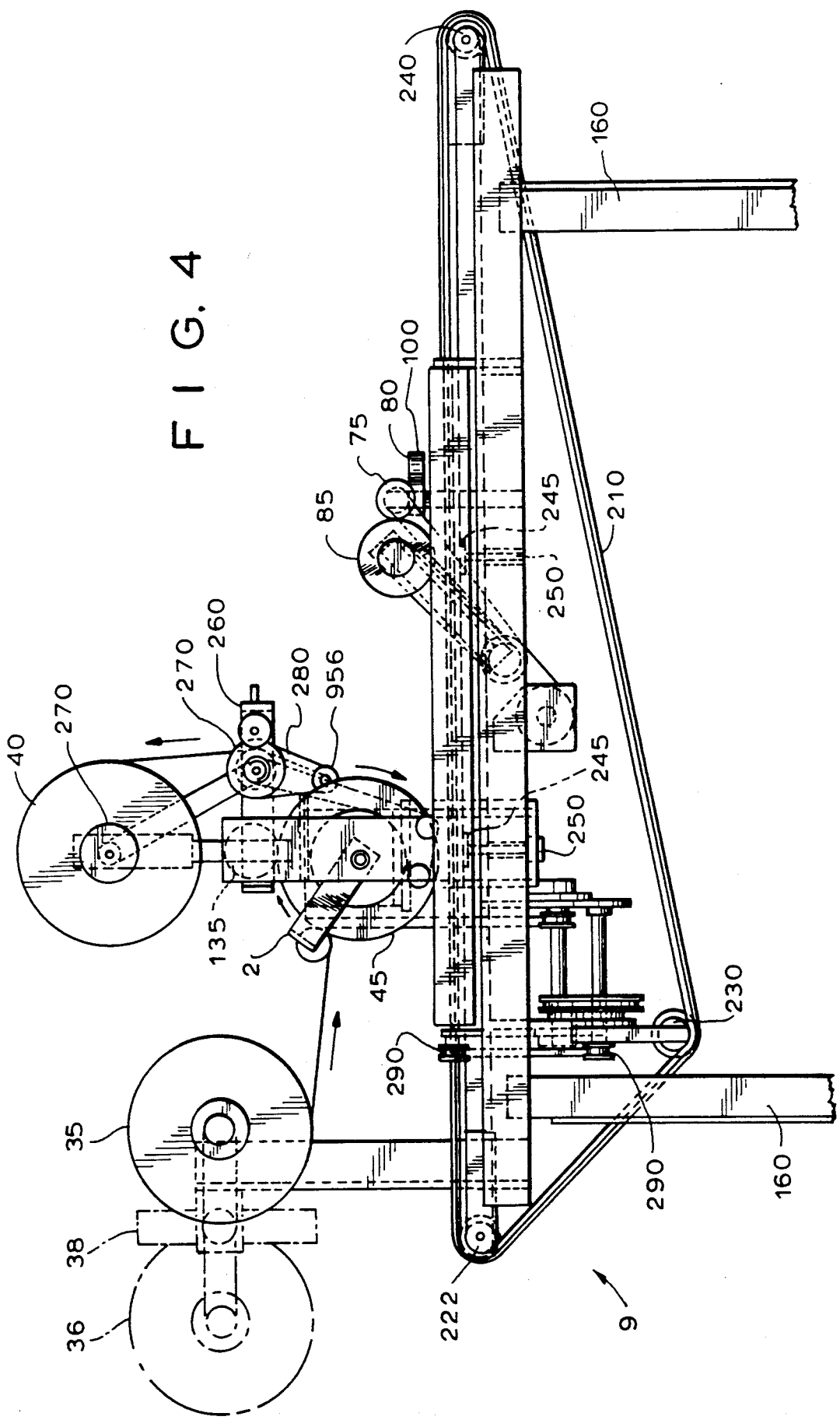
FIG. 4 is a side view of one embodiment of the high speed labeling machine of the present invention showing additional details.

FIG. 4 is a side view of one embodiment of the high speed labeling machine 9 of the present invention. Shown is a standby label reel 36 and label reel 35 attached to a rotomation unit 38. The benefit of this feature is that the reels can be shifted without stopping the machine 9. After the standby reel 36 becomes the active label reel 35, the empty reel is replaced. Carrier tape 1 proceeds from the label reel 35 to the label transfer wheel 45. An idle arm 2 for tape tension control is also shown. Carrier tape 1 is shown running between wheel 45 and label release wheel 135. Spent carrier tape 50 continues around roller 95b and up to uptake reel 40. Glue supply wheel 75, glue supply source 80, doctor blade 100 and glue applicator wheel 85 are shown in position. Requisite supports, timing gears and belts are shown. Stand 160 supports machine 9. A continuous conveyor chain 210, in the form of a flat thin plate or tractor track like pads, are suitable for carrying articles 20 to be labeled. Chain 210 continuously rotates as shown from roller 240 to 220 to 230 to 240 etc. These rollers 220, 230 and 240 can be adjusted to adjust the tension in and length of the chain 210. A variable positioner pad 245, positioned by air cylinder 250, also adjusts the chain 210 by pushing it up or relaxing it to establish by fine tuning the spacing as the can passes tangentially along and under label transfer wheel 45.

Figure 5:
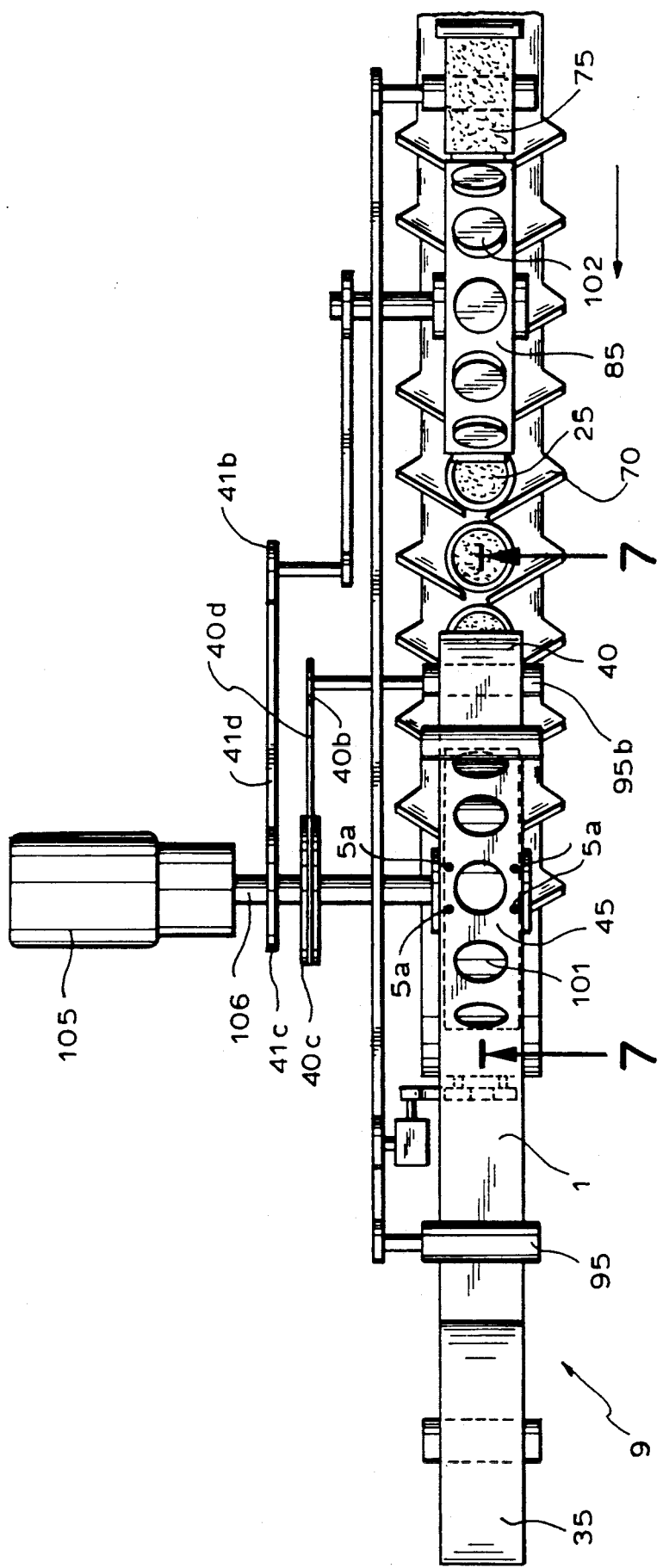
FIG. 5 is a top view of the labeling machine and screw helices.

Waste tension roller mounting 260 helps to adjust the tension in the spent carrier tape 50 as it is wound onto uptake reel 40. Timing gears 270 and gear belts 280 act to help adjust the speed of rotation of uptake reel 40 and label transfer wheel 45 so that they act in concert to apply labels 10 and rewind spent carrier tape 50. Timing gears 290 are interconnected to turn screw helices 70 (not shown) in opposite directions. FIG. 5 more clearly shows a power source 105 and the interaction of the drive shafts and pulleys for precise timing.

FIG. 5 is a top view of the labeling machine 9 and screw helices 70. A single power source 105 drives at least the label transfer wheel 45, roller 95b, the uptake reel 40 and screw helices 70.

While not shown on the drawing, instead of toothed belts, appropriate sprocket and chains may interconnect to precisely time each component of the apparatus. Some adjustment is made, if necessary, to advance or retard any component so that each component of the machine is timed properly. The shafts and belts are rotated in the direction of the arrows. The glue supply wheel 75 may be driven by power source 105 or by a separate source not shown and the label reel 35 is not driven by any power source but rotates under the tension in the carrier tape 1 as the label transfer wheel 45 draws the carrier tape 1 from the label reel 35.

A shaft extension 106 is shown. It is attached to a series of pulleys via a toothed belt arranged to turn the screw helices 70 in opposite directions. Also shown is driven pulley 40c which drives pulley 40b via toothed belt 40d. Likewise, driven pulley 41c drives pulley 41b via toothed belt 41d. Any means which gives positive synchronization of all the components of machine 9 may be used.

Figure 6:
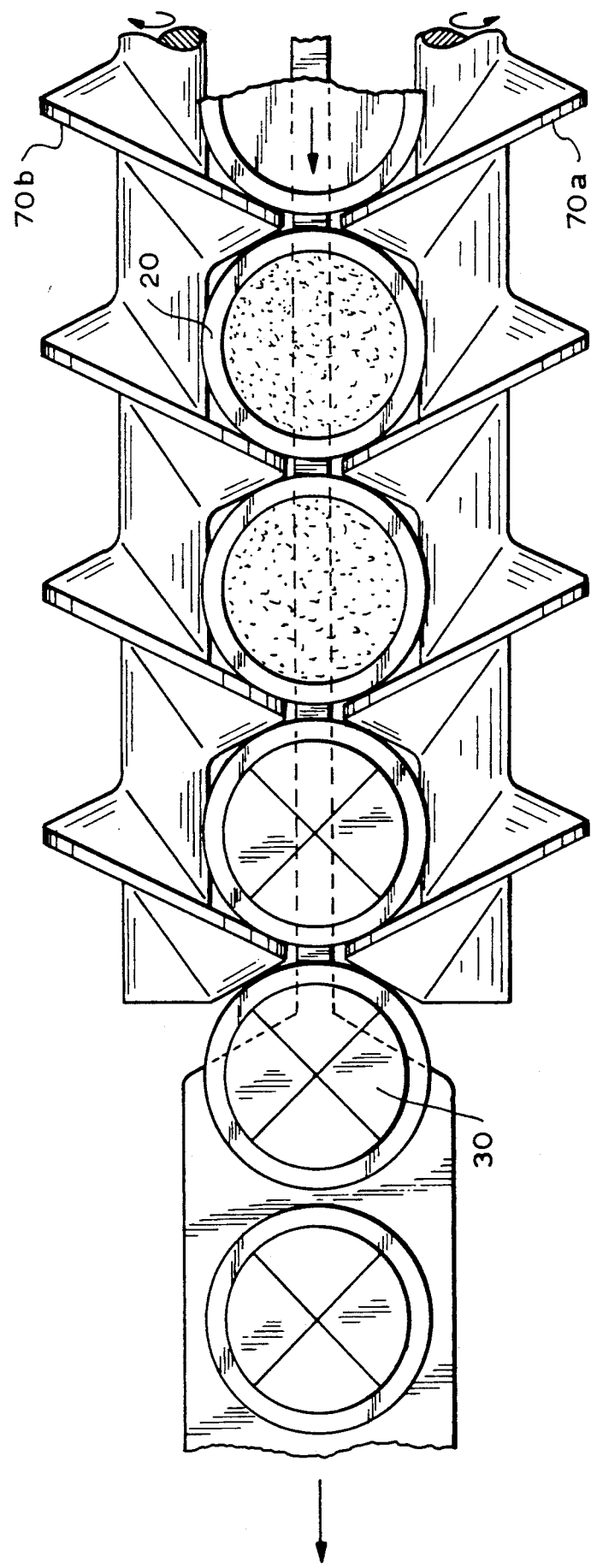
FIG. 6 is a more or less diagrammatic plan view illustrating means for spacing and orienting articles such as, for example, cans.

In FIG. 6, cans 20 are illustrated as being advanced by a conveyor from a source of supply (not shown) in a solid column, moving in the direction of the arrow and between the oppositely rotating screw helices 70a and 70b. The helices 70a and 70b are so designed that as the cans 20 advance between them, the cans 20 are gradually separated. When they emerge from between the helices 70a and 70b, adjacent cans 20 are spaced uniform distances apart. The helices 70a and 70b may be turned in opposite direction and at a proper angular velocity by any suitable motion transmitting connection from a main drive shaft (not shown, but see FIG. 5 where shaft extension 106, attached to a series of pulleys arranged to turn the screw helices 70 in opposite directions via a toothed belt is shown and described). Likewise, the helices 70a and 70b may be placed vertically over one another and turned in an appropriate direction and at a proper angular velocity so that the cans advance between them and emerge uniform distances apart (as above) e.g., when using a horizontal embodiment of the machine for edge labeling a can. Further, a single helix 70 may be employed in combination with a smooth wall (not shown) so that the cans 20, advanced between the helix 70 and the wall, are positioned uniform distances apart. A timing screw is employed to control the timing of the left and the right (or upper and lower) helices 70a and 70b, and the pitch, and therefore the precise spacing of the helices 70a and 70b and the cans 20. As the helices 70a and 70b may be suitably designed to accommodate various container configurations, it is evident that the present machine may be adapted for a number of different types of containers.

It is contemplated that any spacing and orienting means may, if desired, be substituted for the arrangement herein shown in FIG. 6.

Figure 7:
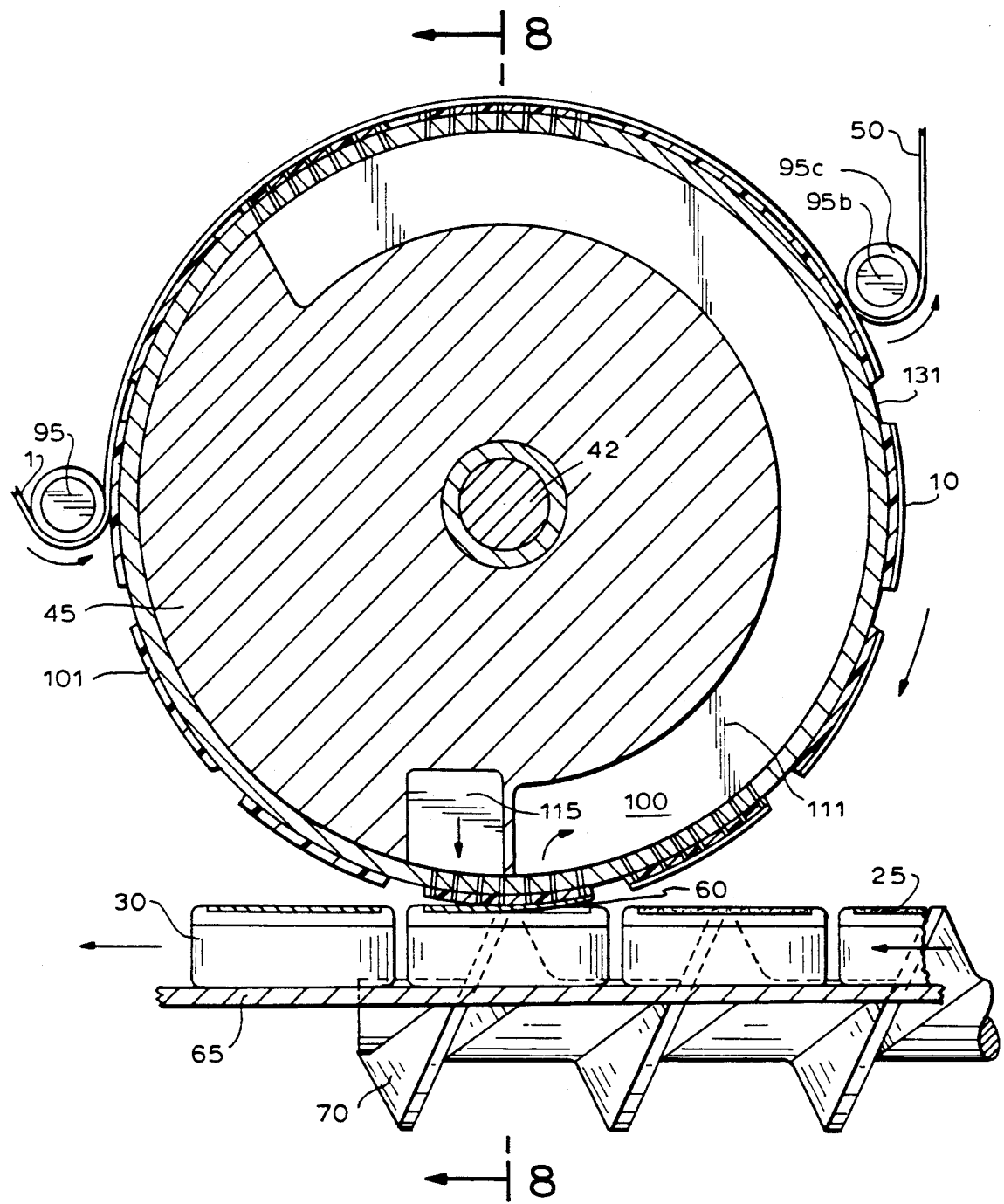
FIG. 7 is an enlarged side view, in section, showing details of the vacuum control mechanism for label manipulation and pressure means for label transfer from the label transfer wheel.

The label transfer wheel 45 is shown in section in FIG. 7. It contains a vacuum chamber 111. Vacuum chamber 111 is stationary with the drum rotating over it. The label transfer wheel 45 rotates about a shaft 42 and has projecting label pads 101 to which the labels 10 are adhered by vacuum suction 110 created in vacuum chamber 111. These pads, which are raised about ⅛ inch above the surface, are separated by recessed areas 131. No cutting mechanism is required as the labels may be pre-cut. Pressure is applied from a pressure chamber 115 to release the label 10 from the vacuum. Pressure chamber 115 likewise is stationary with the drum rotating over it. A label 10 is attached to the can 20 at point 60 either to the glue 25 layer, or if pressure sensitive, directly to the can.

Thus, an increased positive pressure is imparted by the pad 101 to release the label 10. The diameter of the pad 101 is the same as the diameter of the label 10. Elongated vacuum passage holes 205, (shown in cross section in FIG. 8) are spaced as slots across the pads 101. This configuration results in minimum vacuum loss and allows vacuum to be retained on one side and pressure applied at the label application point 60 on the other. The vacuum starts only after labels 10 are placed on the pads 101. Additionally, positive pressure is imparted by the pads 101. The vacuum to pressure change is in cross-direction of the labeling machine.

Figure 8:
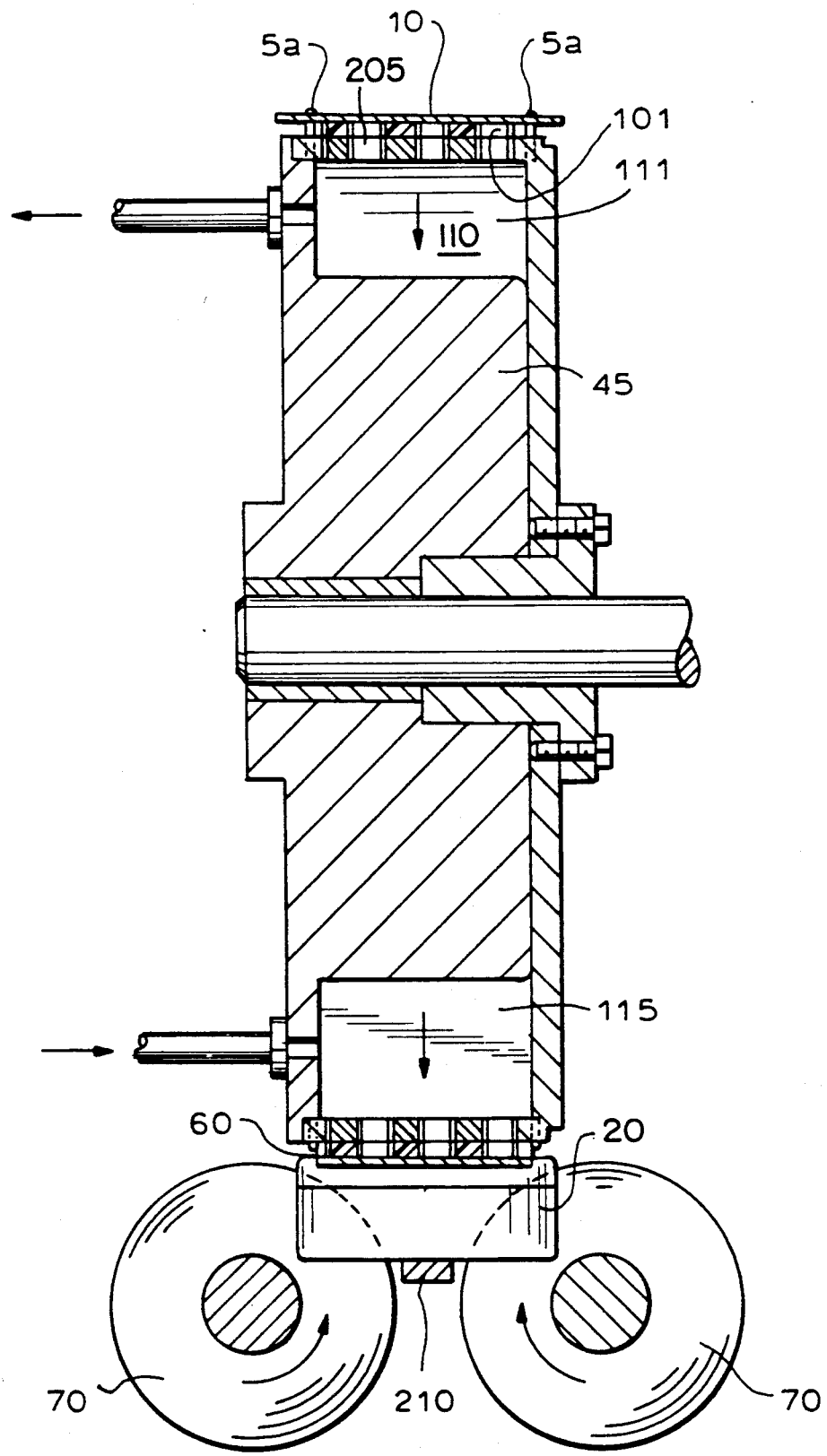
FIG. 8 is a cross-sectional view of the label transfer wheel of FIG. 7.

FIG. 8 is a cross-sectional view of the label transfer wheel 45 of FIG. 7. Shown at the top of FIG. 8 is the label transfer wheel 45, with vacuum suction 110 holding label 10 to label pad 101; vacuum passage holes 205 are shown in this drawing. At the bottom of FIG. 8 is shown the pressure chamber 115 applying downward pressure in the direction of the arrow to release a label from the vacuum at point 60 where the label is attached to the article.

Accordingly, whenever pressure chamber 115 together with the raised label pad 101 cooperate, pressure is applied continuously at the point of tangency of pad 101 and the container 20. Thus, the pressure is applied at the leading edge of the label and continuously throughout the label in cross-machine direction. This feature provides one of the desired advantages of this labeling system as it improves placement accuracy and assures good, positive contact between label, adhesive and container at high rates of speed.

Moreover, as shown in FIG. 4, variable positioner pad 245, positioned by air cylinder 250, raising conveyor chain 210 provides for fine tuning the actual pressure exerted by label pad 101 on a container 20 which is being labeled.

Figure 10:
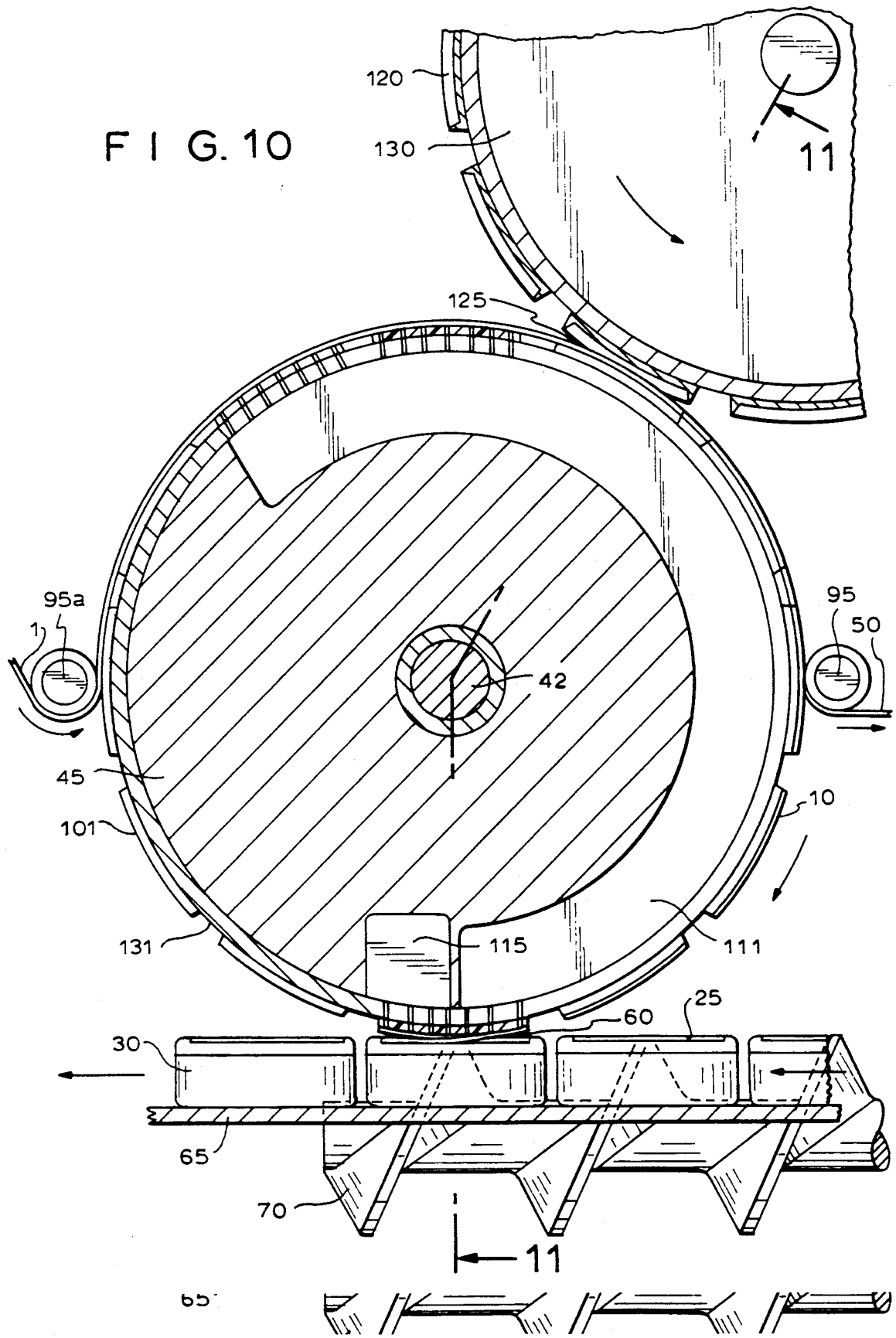
FIG. 10 is the same as FIG. 7 except that it additionally shows the die cutter for the labels.
Figure 11:
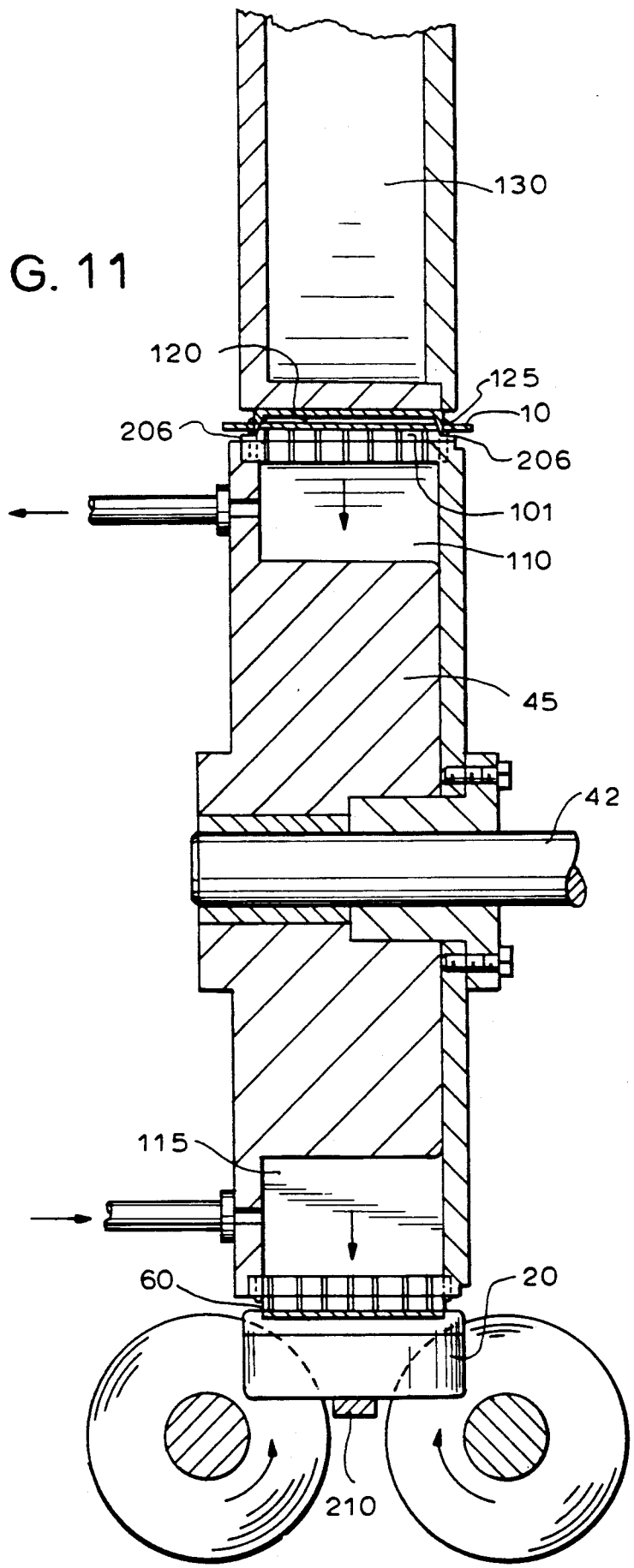
FIG. 11 is a cross sectional view of FIG. 10 and illustrates the die cutter in position for cutting a label held in place by the vacuum control mechanism.

FIGS. 9 through 11 show another embodiment of the invention wherein a die cutter 120 replaces label release wheel 135. In this embodiment, the labels 10 are not pre-cut but rather are cut while they are on the label transfer wheel 45.

FIG. 9, like FIG. 2, shows a carrier tape 1 utilizing sprocket holes 5 for properly and accurately aligning a label 10. Additionally, a die for cutting a label is depicted in FIG. 9 by 120. The die is shown and described in more detail in FIG. 11.

FIG. 10 depicts an enlarged side view, in section, showing details of the vacuum control mechanism for label manipulation and pressure means for label transfer from the label transfer wheel 45 as in FIG. 7. FIG. 10 additionally shows the die cutter wheel 130 for cutting labels at point 125 with die cutter 120. The die cutter 120 and label pad 101 are aligned at point 125 so that the label 10 is cut and held by vacuum suction 110 on label pad 101 as already described. The die cutter 120 is usually a rotary die of diameter 10 to 12 inches. Die cutter 120 can also have 3 or 4 dies, run at 4 or 3 times, respectively, the peripheral speed of label transfer wheel 45. As mentioned before, the label transfer wheel 45 has sprockets 5a for precise engagement. Sprockets 5a are smoothly conical in shape with a cylindrically shaped portion at the bottom. This eliminates the need for retractable pins as sprockets. When the die cutter 120 and label pad 101 are properly aligned, the die cutter 120 traverses the carrier tape 1 cutting label 10.

FIG. 11 is a cross-sectional view of the label transfer wheel 45 and the die cutter wheel 130. A series of dies are positioned around the perimeter of a wheel such as die cutter wheel 130 cut against a hardened anvil plate 206 around the perimeter of the pad 101. The label 10 is cut by die cutter 120 at label cutting point 125, and held by vacuum suction 110 on label pad 101 as described above.

Therefore, shown at the top of FIG. 11 is the die cutter wheel 130 with die cutter 120 at label cutting point 125. The label 10, held by vacuum suction 110 on label pad 101, is cut by die cutter 120 at point 125. Label transfer wheel 45 is also shown. It rotates about shaft 42. At the bottom of FIG. 11 is shown the pressure chamber 115 applying downward pressure in the direction of the arrow to release a label from the vacuum at point 60 where the label is attached to the article.

FIG. 12 was described earlier. It shows, in cross-section, label release wheel 135 positioned above the label transfer wheel 45. Label release wheel 135 is positioned so that it pushes the carrier web around the label perimeter and down approximately ⅛ inch thereby severing the pinpoint attachment tabs 15 (not shown). The pad 101 on label transfer wheel 45 is raised ⅛ inch so that there is a recessed area 131 around each pad 101. The R.P.M. speed of the label release wheel 135 is three times the speed of the label transfer wheel 45 or in any synchronous relationship to the size of each of the wheels 135 and 45. As both wheels spin, the periphery of the label release wheel 135 fits into the recessed area 131 around pad 101 and therefore severs the label 10. As the label 10 has previously been positioned by the spockets 5a and held by vacuum onto pad 101, the precise position for each label is being maintained during this step.

Of course, it is clear from this description that labels can be of any shape, and that the articles can be positioned so that the labels can be applied both on the vertical and on the horizontal. Additionally, the containers may be of different shape. Further advantages of the invention include the ease of cleaning because of the design. The apparatus of the invention works well both with and without glue. In a preferred embodiment, a label is applied to a top of a can. Preferably, the top of the can is flexible for ease of label application whether or not glue is used. Also, the labels may be replenished without stopping the line and every can is inspected and then rejected if it has no label.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A method for applying a label to an advancing article comprising
   (i) supplying a label carrier tape from a carrier wheel to a label transfer wheel;
   (ii) engaging said label carrier tape on said label transfer wheel by sprockets on said label transfer wheel in precise registry of said label with a location for said label on said transfer wheel;
   (iii) removing a label from said carrier tape;
   (iv) holding said label by vacuum suction on said location for said label on said transfer wheel;
   (v) aligning synchronously said label on said location for said label on said transfer wheel with a surface of said article as said article is advanced;
   (vi) applying pressure to a leading edge of said label upon placement of said label on said article to remove said label from said location for said label on said transfer wheel;
   (vii) continuously applying pressure to label surface as rotation progresses; and
   (viii) continuously advancing said article.

2. The method as defined in claim 1 wherein said advanced article has glue on a surface to which said label is applied.

3. The method as defined in claim 1 wherein said carrier tape is a monolayer with pre-die cut labels therein.

4. The method as defined in claim 1 wherein said label carrier tape, after removal of said label, is respooled on a reel for said labelless monolayer.

5. The method as defined in claim 1 wherein said label carrier tape contains sprocket holes and said label carrier and said label are held under constant tension as said label carrier is removed from a carrier wheel.

6. In a method of applying labels to articles as defined in claim 1, the improvement comprising wherein a plurality of sprocket holes are cut in said carrier tape in registry with a location for a label on said carrier tape, said sprocket holes being in the form of a U-shape with a tab attached to an open end of said U.

7. The method as defined in claim 1 wherein the label is applied onto a vertical surface of said article.

8. The method as defined in claim 1 wherein the label is applied onto a horizontal surface of said article.

9. The method as defined in claim 1 wherein the label is circular in shape.

10. The method as defined in claim 1 wherein the label is rectangular in shape.

11. A method for applying a label to an advancing article comprising (i) supplying a label carrier tape from a carrier wheel to a label transfer wheel;
   (ii) engaging said label carrier tape on said label transfer wheel by sprockets on said label transfer wheel in precise registry of said label with a location for said label on said transfer wheel;
   (iii) removing a label from said carrier tape;
   (iv) holding said label by vacuum suction on said location for said label on said transfer wheel;
   (v) depositing glue on the surface of said article;
   (vi) aligning synchronously said label on said location for said label on said transfer wheel with a surface of said article as said article is advanced;
   (vii) applying pressure to a leading edge of said label upon placement of said label on said article to remove said label from said location for said label on said transfer wheel;
   (viii) applying pressure on said label tangentially across said transfer wheel;
   (ix) adhering said label to the surface of said article by means of the glue on said surface; and
   (x) continuously advancing said article.

12. A method for applying a label to an advancing article comprising
   (i) supplying a single sheet label tape wherein on a first surface, said label tape carries a label with label information and on a second surface said label tape carries a pressure sensitive adhesive, said label tape being advanced under constant tension, from a carrier wheel to a label transfer wheel;
   (ii) severing a label from said carrier tape, said label including on a first surface, label information, and on a second surface, a pressure sensitive adhesive, said first surface positioned adjacent to the label transfer wheel;
   (iii) engaging said label carrier tape on said label transfer wheel by sprockets on said wheel in precise registry with said label tape coincident to a location for said label on said transfer wheel;
   (iv) holding said label by vacuum suction on said location for said label on said transfer wheel;
   (v) aligning synchronously said label on said location for said label on said transfer wheel with a surface of said article as said article is advanced;
   (iv) applying pressure to a leading edge of said label upon placement of said label on said article to remove said label from said location for said label on said transfer wheel;
   (vii) continuously applying pressure tangentially across said label on said article; and
   (viii) continuously advancing said article.

13. A method for applying a label to an advancing article comprising
   (i) supplying a label carrier tape bearing pre-cut labels from a carrier wheel to a label transfer wheel;
   (ii) engaging said label carrier tape on said label transfer wheel by sprockets on said label transfer wheel in precise registry of said pre-cut label with a location for said precut label on said transfer wheel;
   (iii) removing a pre-cut label from said carrier tape;
   (iv) holding said pre-cut label by vacuum suction on said location for said pre-cut label on said transfer wheel;
   (v) aligning synchronously said pre-cut label on said location for said pre-cut label on said transfer wheel with a surface of said article as said article is advanced;
   (vi) applying pressure to a leading edge of said pre-cut label upon placement of said pre-cut label on said article to remove said pre-cut label from said location for said pre-cut label on said transfer wheel;
   (viii) continuously advancing said article.

14. A method for applying a label to an advancing article comprising
  (i) supplying a label carrier tape from a carrier wheel to a label transfer wheel;
  (ii) engaging said label carrier tape on said label transfer wheel by sprockets on said label transfer wheel in precise registry on said label with a location for said label on said transfer wheel;
  (iii) cutting a label from said carrier tape with a die cutter;
  (iv) holding said label by vacuum suction on said location for said label on said transfer wheel;
  (v) aligning synchronously said label on said location for said label on said transfer wheel with a surface of said article as said article is advanced;
  (vi) applying pressure to a leading edge of said label upon placement of said label on said article to remove said label from said location for said label on said transfer wheel;
  (vii) applying pressure on said label tangentially across said transfer wheel; and
  (vii) continuously advancing said article.

15. A machine for rapid application of labels from a label supply source, comprising
  (i) a label supply source for labels on a continuous tape; said continuous tape comprising a plurality of labels evenly spaced apart with a plurality of sprocket holes within said tape for each of said labels for aligning each of said labels;
  (ii) a rotational transfer means for said labels for transferring individual labels onto a container, including sprocket means for said rotational transfer means for engaging with said sprocket holes of said tape;
  (iii) means for guiding said tape, said means cooperating with a means for positioning said label and said sprocket means on said rotational transfer means;
  (iv) means for severing individual labels from said continuous tape before transferring said individual labels onto a container;
  (v) vacuum means within said rotational transfer means for precise registry of each individual label on a peripheral surface of said rotational transfer means for said label, said vacuum means applying negative pressure uniformly across said peripheral surface and on each label;
  (vi) means for synchronous, precisely spaced apart advancing of a container with respect to said rotational transfer means and a label for said container on said rotational transfer means; and
  (vii) means for applying positive pressure in both a cross-machine direction and tangential direction on said label for releasing said label from said peripheral surface of said rotational transfer means and placing said label on said container in precise registry therewith.

16. The machine as defined in claim 15, wherein means for both cross-machine and tangential direction application of pressure comprises mechanical means for exerting pressure on said container by said rotational transfer means for said labels.

17. The machine as defined in claim 15, wherein the means for synchronous precisely spaced apart advancing of a container include conveyor means.

18. The machine as defined in claim 17, wherein the conveyor means include means for urging said conveyor means for engagement of a container with said label on said rotational transfer means for said labels.

19. The machine as defined in claim 15, wherein said means for severing individual labels from said continuous tape comprises label replicating cam means for a partially pre-cut label within said continuous tape.

20. A machine for rapid application of labels from a label supply source, comprising
  (i) a label supply source for labels on a continuous tape; said continuous tape comprising a plurality of labels evenly spaced apart with a plurality of sprocket holes within said tape for each of said labels for aligning each of said labels;
  (ii) a rotational transfer means for said labels for transferring individual labels onto a container, including sprocket means for said rotational transfer means for engaging with said sprocket holes of said tape;
  (iii) means for guiding said tape, said means cooperating with a means for positioning said label and said sprocket means on said rotational transfer means;
  (iv) means for severing individual labels from said continuous tape before transferring said individual labels onto a container;
  (v) vacuum means within said rotational transfer means for precise registry of each individual label on a peripheral surface of said rotational transfer means for said label, said vacuum means applying negative pressure uniformly across said peripheral surface and on each label;
  (vi) means for synchronous, precisely spaced apart advancing of a container with respect to said rotational transfer means and a label for said container on said rotational transfer means;
  (vii) means for applying positive pressure in both a cross-machine direction and tangential direction on said label for releasing and placing said label on said container in precise registry therewith; and
  (viii) means for application of glue onto a surface of said container for application of a label on said glue.

21. The machine as defined in claim 20, wherein said means for application of glue include means for inactivating the same when said labels carry pressure sensitive adhesive thereon.

22. A machine for rapid application of labels from a label supply source, comprising
  (i) a label supply source for labels on a continuous tape; said continuous tape comprising a plurality of labels evenly spaced apart with a plurality of sprocket holes within said tape for each of said labels for aligning each of said labels;
  (ii) a rotational transfer means for said labels for transferring individual labels onto a container, including sprocket means for said rotational transfer means for engaging with said sprocket holes of said tape;
  (iii) means for guiding said tape, said means cooperating with a means for positioning said label and said sprocket means on said rotational transfer means;
  (iv) means for severing individual labels from said continuous tape before transferring said individual labels onto a container;
  (v) vacuum means within said rotational transfer means for precise registry of each individual label on a peripheral surface of said rotational transfer means for said label, said vacuum means applying negative pressure uniformly across said peripheral surface and on each label;
  (vi) means for synchronous, precisely spaced apart advancing of a container with respect to said rotational transfer means and a label for said container on said rotational transfer means; and (vii) means for applying positive pressure in both a cross-machine direction and tangential direction on said label for releasing and placing said label on said container in precise registry therewith.

wherein said means for applying positive pressure in both a cross-machine direction and tangential direction comprises pneumatic means within said rotational transfer means for exerting pressure on said label.

23. A machine for rapid application of labels from a label supply source, comprising
(i) a label supply source for labels on a continuous tape; said continuous tape comprising a plurality of labels evenly spaced apart with a plurality of sprocket holes within said tape for each of said labels for aligning each of said labels;
(ii) a rotational transfer means for said labels for transferring individual labels onto a container, including sprocket means for said rotational transfer means for engaging with said sprocket holes of said tape;
(iii) means for guiding said tape, said means cooperating with a means for positioning said label and said sprocket means on said rotational transfer means;
(iv) means for severing individual labels from said continuous tape before transferring said individual labels onto a container;
(v) vacuum means within said rotational transfer means for precise registry of each individual label on a peripheral surface of said rotational transfer means for said label, said vacuum means applying negative pressure uniformly across said peripheral surface and on each label;
(vi) means for synchronous, precisely spaced apart advancing of a container with respect to said rotational transfer means and a label for said container on said rotational transfer means; and
(vii) means for applying positive pressure in both a cross-machine direction and tangential direction on said label for releasing and placing said label on said container in precise registry therewith;
wherein said means for synchronous, precisely spaced apart advancing of a container comprises helix screw means.

24. The machine as defined in claim 23, wherein the helix screw means are double helix screw means.

25. A machine for rapid application of labels from a label supply source, comprising
(i) a label supply source for partially pre-cut labels on a continuous tape; said continuous tape comprising a plurality of labels evenly spaced apart with a plurality of sprocket holes within said tape for each of said labels for aligning each of said labels;
(ii) a rotational transfer means for said labels for transferring individual labels onto a container, including sprocket means for said rotational transfer means for engaging with said sprocket holes of said tape;
(iii) means for guiding said tape, said means cooperating with a means for positioning said label and said sprocket means on said rotational transfer means;
(iv) means for severing individual partially pre-cut labels from said continuous tape before transferring said individual labels onto a container, wherein said means is a wheel with a raised surface oversized with respect to said partially pre-cut label on said rotational transfer means for said label with respect to an individual label on said tape;

(v) vacuum means within said rotational transfer means for precise registry of each individual label on a peripheral surface of said rotational transfer means for said label, said vacuum means applying negative pressure uniformly across said peripheral surface and on each label;
(vi) means for synchronous, precisely spaced apart advancing of a container with respect to said rotational transfer means and a label for said container on said rotational transfer means; and
(vii) means for applying positive pressure in both a cross-machine direction and tangential direction on said label for releasing and placing said label on said container in precise registry therewith.

26. A machine for rapid application of labels from a label supply source, comprising
(i) a label supply source for labels on a continuous tape; said continuous tape comprising a plurality of labels evenly spaced apart with a plurality of sprocket holes within said tape for each of said labels for aligning each of said labels;
(ii) a rotational transfer means for said labels for transferring individual labels onto a container, including sprocket means for said rotational transfer means for engaging with said sprocket holes of said tape;
(iii) means for guiding said tape, said means cooperating with a means for positioning said label and said sprocket means on said rotational transfer means;
(iv) means for severing individual labels from said continuous tape before transferring said individual labels onto a container;
(v) vacuum means within said rotational transfer means for precise registry of each individual label on a peripheral surface of said rotational transfer means for said label, said vacuum means applying negative pressure uniformly across said peripheral surface and on each label;
(vi) means for synchronous, precisely spaced apart advancing of a container with respect to said rotational transfer means and a label for said container on said rotational transfer means;
(vii) means for applying positive pressure in both a cross-machine direction and tangential direction on said label for releasing and placing said label on said container in precise registry therewith; and
(viii) means for removal of a labelless continuous tape from said rotational transfer means.

27. The machine is defined in claim 26, wherein said means for removal of said labelless continuous tape includes a slip-clutch for varying the rotational speed of said means relative to the label supply source.

28. A machine for rapid application of labels from a label supply source, comprising
(i) a label supply source for labels on a continuous tape; said continuous tape comprising a plurality of labels evenly spaced apart with a plurality of sprocket holes within said tape for each of said labels for aligning each of said labels;
(ii) a rotational transfer means for said labels for transferring individual labels onto a container, including sprocket means for said rotational transfer means for engaging with said sprocket holes of said tape;
(iii) means for guiding said tape, said means cooperating with a means for positioning said label and said sprocket means on said rotational transfer means;
(iv) means for severing individual labels from said continuous tape before transferring said individual labels onto a container, comprising die means for cutting individual labels from said continuous tape operatively interconnected with said rotational transfer means;
(v) vacuum means within said rotational transfer means for precise registry of each individual label on a peripheral surface of said rotational transfer means for said label, said vacuum means applying negative pressure uniformly across said peripheral surface and on each label;
(vi) means for synchronous, precisely spaced apart advancing of a container with respect to said rotational transfer means and a label for said container on said rotational transfer means; and
(vii) means for applying positive pressure in both a cross-machine direction and tangential direction on said label for releasing and placing said label on said container in precise registry therewith.

29. A machine for rapid application of labels from a label supply source, comprising
(i) a label supply source for labels on a continuous tape; said continuous tape comprising a plurality of labels evenly spaced apart with a plurality of sprocket holes within said tape for each of said labels for aligning each of said labels;
(ii) a rotational transfer means for said labels for transferring individual labels onto a container, including sprocket means for said rotational transfer means for engaging with said sprocket holes of said tape;
(iii) means for guiding said tape, said means cooperating with a means for positioning said label and said sprocket means on said rotational transfer means;
(iv) means for severing individual labels from said continuous tape before transferring said individual labels onto a container;
(v) vacuum means within said rotational transfer means for precise registry of each individual label on a peripheral surface of said rotational transfer means for said label, said vacuum means applying negative pressure uniformly across said peripheral surface and on each label;
(vi) means for synchronous, precisely spaced apart advancing of a container with respect to said rotational transfer means and a label for said container on said rotational transfer means; and
(vii) means for applying positive pressure in both a cross-machine direction and tangential direction on said label for releasing and placing said label on said container in precise registry therewith;
said sprocket holes on said continuous tape including tongue-shaped perforations for engaging with said sprocket means.

* * * * *